US006675128B1

(12) United States Patent
Hellerstein

(10) Patent No.: US 6,675,128 B1
(45) Date of Patent: Jan. 6, 2004

(54) METHODS AND APPARATUS FOR PERFORMANCE MANAGEMENT USING SELF-ADJUSTING MODEL-BASED POLICIES

(75) Inventor: Joseph L. Hellerstein, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/409,151

(22) Filed: Sep. 30, 1999

(51) Int. Cl.[7] .................................................. G06N 7/00
(52) U.S. Cl. ......................................... 702/182; 700/31
(58) Field of Search ....................... 700/28–31; 702/58, 702/81, 116, 182–185, 198–199; 703/2, 22

(56) References Cited

U.S. PATENT DOCUMENTS

| | | | | | |
|---|---|---|---|---|---|
| 3,601,588 | A | * | 8/1971 | Bristol | 700/31 |
| 4,626,992 | A | * | 12/1986 | Greaves et al. | 600/300 |
| 5,996,090 | A | * | 11/1999 | Hellerstein | 714/25 |
| 6,081,197 | A | * | 6/2000 | Garrick et al. | 340/636 |
| 6,330,553 | B1 | * | 12/2001 | Uchikawa et al. | 706/2 |
| 6,415,276 | B1 | * | 7/2002 | Heger et al. | 706/52 |
| 6,513,129 | B1 | * | 1/2003 | Tentij et al. | 714/4 |

OTHER PUBLICATIONS

J. Buzen et al., "MASF–Multivariate Adaptive Statistical Filtering," Proceedings of the Computer Measurement Group, pp. 1–10, 1995.

L.L. Ho et al., "Adaptive Network/Service Fault Detection in Transaction–Oriented Wide Area Networks," Integrated Network Management VI, edited by M. Sloman et al., IEEE Publishing, pp. 761–775, May 1999.

M. Thottan et al., "Fault Prediction at the Network Layer Using Intelligent Agents," Integrated Network Management VI, edited by M. Sloman et al., IEEE Publishing, pp. 745–759, May 1999.

J.L. Hellerstein et al., "An Approach to Predictive Detection for Service Management," Integrated Network Management VI, edited by M. Sloman et al., IEEE Publishing, pp. 309–322, May 1999.

G.E.P. Box et al., "Time Series Analysis Forecasting and Control," Chapter 1.2, Stochastic and Deterministic Dynamic Mathematical Models, Prentice Hall, pp. 7–12, 1997.

* cited by examiner

*Primary Examiner*—Marc S. Hoff
*Assistant Examiner*—Craig Steven Miller
(74) *Attorney, Agent, or Firm*—Gail H. Zarick; Ryan, Mason & Lewis, LLP

(57) ABSTRACT

Methods and apparatus are described that use models of measurement variables to provide self-adjusting policies that: (a) reduce the administrative overhead of specifying thresholds and (b) provide a means for pro-active management by automatically constructing warning thresholds based on the probability of an alarm occurring within a time horizon. The invention includes components for model construction, threshold construction, policy evaluation, and action taking. Several kinds of meta policies are used in accordance with the invention to provide adaptation and pro-active management.

15 Claims, 5 Drawing Sheets

METHODS AND APPARATUS FOR PERFORMANCE MANAGEMENT USING SELF-ADJUSTING MODEL-BASED POLICIES

FIELD OF THE INVENTION

The present invention relates generally to automating operations in accordance with performance management systems and, more specifically, to facilitating the specification of exceptional conditions in such systems.

BACKGROUND OF THE INVENTION

Approximately 80% of the cost of networked systems can be attributed to management and operations. These costs are related to activities such as distributing and installing software, providing help desk support, and detecting performance and availability problems.

Generally, existing practice for detecting performance and availability problems consists of the following steps: (i) determining a set of metrics to monitor that indicate the presence of problems (e.g., CPU utilization, error rates, transaction request rates); (ii) establishing thresholds on the values of these metrics based on past experience; (iii) using management system software to detect threshold violations; and (iv) responding to threshold violations by taking actions (e.g., adjusting user priorities, restricting the admission of traffic into the network).

So fundamental are these steps to existing practice that the information that drives them is typically externalized as management."policies." A policy consists of a metric (or function of multiple metrics), a relational operator that specifies the direction of change in the metric that is undesirable, a threshold value, and an action to take when the threshold is violated.

Typically, policies are expressed as if-then rules. The if-part (or left-hand side, LHS, of the policy) contains a predicate expressed as a bound on one or more metrics. The then-part (or right-hand side, RHS, of the policy) contains the action to take. An example is: "If CPU utilization is greater than 90%, then alarm." Here, "CPU utilization" is the metric, the relational operator is "greater than," the threshold value is "90%," and the action is "alarm" (e.g., send an urgent message to the operations console). The threshold value for alarms may be chosen so that it lies well beyond what is considered normal. We use the term "alarm threshold" for the metric value that, if exceeded, results in either the generation of an alarm or a management action (e.g., terminate a process). Existing approaches check for threshold violations and, when these violations occur, initiate the action specified in the right-hand side of the policy.

In practice, policies have another aspect as well. In order to eliminate transients, it is often the case that the right-hand side of a policy is executed only after the left-hand side of the policy has been satisfied for several successive time intervals. Thus, a common version of the foregoing example is: "If CPU utilization is greater than 90% for three successive time intervals, then alarm." Thus, embedded within the left-hand side of policies in existing art are higher level policies that determine when the right-hand side should be executed. An example of such a higher level policy is "for three successive time intervals," as in the foregoing example.

Existing art provides for policy authoring and execution. That is, administrators typically have a graphical user interface through which they specify policy metrics, threshold values, relational operators, and actions. The management system acquires the data necessary to test the left-hand side of a policy and to execute the right-hand side of a policy.

In order to author policies, administrators must specify one or more values for alarm thresholds (e.g., 90% CPU utilization). Doing so can be quite burdensome since the appropriate choice for an alarm threshold depends on factors such as configuration and workload. To complicate matters, workloads are time varying and so the appropriate choice of threshold values is time varying as well.

Researchers have tried to address these difficulties by: (i) computing threshold values from historical data (e.g., J. Buzen and A. Shum, "MASF-Multivariate Adaptive Statistical Filtering," Proceedings of the Computer Measurement Group, pp. 1–10, 1995; and L. Ho et al., "Adaptive Network/ Service Fault Detection in Transaction-Oriented Wide Area Networks," Integrated Network Management VI, edited by M. Sloman et al., IEEE Publishing, 1999); and (b) developing multivariate tests for network-based problems (e.g., M. Thottan and C. Ji, "Fault Prediction at the Network Layer Using Intelligent Agents," Integrated Network Management VI, edited by M. Sloman et al., IEEE Publishing, 1999), and automating the updates of threshold values (e.g., Ho et al. article).

Even so, existing art is deficient in two respects: (1) there is no mechanism for automated adaptation of alarm thresholds tested by agents on managed elements; and (2) higher level policies are embedded within the left-hand sides of the policies in existing art and hence changing these policies often requires extensive modifications to the management automation. Note that item (1) requires more than the distribution of new threshold values (e.g., as in Ho et al.). It also requires a means to determine when threshold values should be changed.

In addition to the foregoing, existing art is deficient in the manner in which "warning policies" are handled. Warning policies provide advanced notice of alarm situations so that management staff can detect problems before they lead to widespread disruptions. In the existing art, warning policies are constructed manually by administrators. That is, administrators must specify a set of warning thresholds in addition to the alarm thresholds. Violating a warning threshold causes a message to be sent to the operations staff. Below is an example of a warning threshold for the previously introduced policy for CPU utilization: "If CPU utilization is greater than 80% for three successive time intervals, then warn."

In existing practice, warning thresholds are specified in the same manner as alarm thresholds. Thus, there is no insight as to when or if the alarm threshold will be violated once a warning threshold is violated. Further, administrators are burdened with specifying still more thresholds.

SUMMARY OF THE INVENTION

The present invention provides methods and apparatus that reduce the burden on administrators for performance management. The methods and apparatus use models of metric values to construct and enforce: (1) alarm policies that adjust automatically to changes, for example, in configuration, topology, and workload; and (2) warning policies based on the probability of violating an alarm policy within a time horizon.

It is to be appreciated that a performance management system of the present invention preferably utilizes forecasting models (e.g., analysis of variance and time series models) to capture non-stationarities (e.g., time-of-day variations) and time-serial dependencies. For example, as described in J. Hellerstein, F. Zhang, and P. Shahabuddin, "An Approach to Predictive Detection for Service Level Management," Integrated Network Management VI, edited by M. Sloman et al., IEEE Publishing, May 1999, the disclosure of which is incorporated herein by reference, a model in which $S(i,j,k,l)$ is the value of a metric at time of day (i), day of week (j), month (k), and instance (l) may be employed in accordance with the invention. The model is: $S(i,j,k,l)=mean+mean\_tod(i)+mean\_day-of-week(j)+mean\_month(k)+e(i,j,k,l)$. Here, the terms beginning with "mean" are constants that are estimated from the data, and $e(i,j,k,l)$ are the residuals of S. These constants may be estimated using standard statistical techniques such as analysis of variance and least square regression, which are well known in the art. The residuals are identically distributed (stationary), but time serial dependencies may remain. To remove time serial dependencies, a second model may be used: $e(t)=a1*e(t-1)+a2*e(t-2)+y(t)$, where a1 and a2 are constants estimated from the data and the $y(t)$ are independent and identically distributed normal random variables. The $y(t)$ are the result of removing the time serial dependencies. Advantageously, with these two models, it is possible to forecast future values of metrics.

In addition to using models of metric behavior, the invention also utilizes the idea of separation of different kinds of information. Sometimes referred to as explicit knowledge representation, this technology has been used widely in the construction of expert systems. We use explicit knowledge representation to isolate the conditions for triggering right-hand sides from the other elements of a policy.

The present invention preferably deals with two kinds of policies. The first kind of policies, referred to as "control policies," address the essence of the left-hand side of existing policies: identifying the metrics to be tested and the directional change in these metrics that constitutes an exceptional situation. The second kind of policies, referred to as "meta policies," determine how control policies are interpreted. Meta policies address the following: (a) the acceptable level of false alarms; (b) the choice of alarm threshold (based on metric models and false alarm policies); (c) when models should be reconstructed; and (d) when warnings are generated.

We begin with control policies. These consist of three parts: (a) a simplified left-hand side; (b) a right-hand side having a similar form as in the existing art; and (c) a class (or label) that identifies the relevant meta policies. The left-hand side contains: (1) a metric to check; and (2) an indicator of directional change for the metric. An example of a control policy is:

CLASS_FILE.SERVER: If CPU utilization is too large, then alarm.

Here, CLASS_FILE.SERVER is a label that identifies the meta policies that apply to the control policy. The left-hand side of the policy specifies the metric to be tested, i.e., "CPU utilization," and the directional change that is considered excessive, i.e., "too large."

We consider four kinds of meta policies. For each, there is a class description that specifies the control policies for which the meta policy applies. This description can be expressed in many ways including, for instance, the use of scope hierarchies and wild cards. For example, the class description CLASS_*.SERVER matches the class CLASS_FILE.SERVER, where the symbol * denotes the wild card position.

Considered first are false alarm policies. These policies are used in combination with the metric models to determine threshold values to test. False alarm policies are expressed as an upper limit on the probability of a false alarm. For example:

False alarm policy for CLASS_*.SERVER: Probability (false alarm)<0.05

False alarm policies are employed as follows. For each control policy that matches the class description CLASS_*.SERVER, the control policy's metric is identified, and the associated metric model is located. This model is used to determine the metric's 95th percentile for the time interval in which the control policy is being evaluated, which is used as the alarm threshold. The observed value of CPU utilization is then compared to this threshold.

Considered next are a trigger policies. A trigger policy specifies the circumstances under which a satisfied left-hand side of a policy will cause the right-hand side of the policy to execute. According to an embodiment of the invention, we specify the number of times that the left-hand side must be satisfied within a specified number of evaluations. For example:

Trigger policy for CLASS_*.SERVER: Execute right-hand side if the left-hand side is satisfied three times in three evaluations.

This trigger policy applies to all control polices with classes that have SERVER as the last component. The right-hand side of the policy will be executed if the left-hand side of the policy is satisfied three times in succession. A control policy is said to be "enabled" if it satisfies its trigger policy.

A third kind of meta policy addresses the conditions under which warnings are generated. There are two parts to this specification. The first indicates the time horizon in which a warning is desired. The second dictates how certain it must be that the alarm threshold will be violated. An example is:

Warning policy for CLASS_*.SERVER: Warn if the probability of violating the alarm threshold is greater than 0.7 in a 5 minute time horizon.

Note that there may be multiple warning policies for the same class of control policies, as long as the warning policies specify different time horizons. Further, observe that both warning and false alarm policies have a probability, although the semantics of this probability are different. Thus, from the point of view of information representation, a false alarm policy can be represented as a warning policy with a time horizon of zero.

The fourth meta policy dictates when the unknown constants in the metric model must be re-estimated based on the frequency of violation of alarm thresholds. This is specified in a manner similar to that used for trigger policies:

Model reconstruction policy for CLASS_*.SERVER: Reconstruct the model if the left-hand side is satisfied 8 times in 10 evaluations.

As will be illustrated in detail below, a performance management system of the invention may comprise a system manager to support the policies described herein which is responsible for one or more model-based policy agents that respectively reside on one or more managed elements. The system manager provides an interface for the administrator through which policies are authored and messages are reported. The model-based policy agent may preferably have the following components: an agent side policy controller, a model constructor, a threshold constructor, a control policy evaluator, and an action executor. In such an embodiment, the policy controller provides overall control of the agent. The model constructor estimates the unknown constants in the metric models that provide a way to predict future values and a method of determining the distribution of metric values for a particular system, e.g., time-of-day, etc.

The threshold constructor uses the metric models and the false alarm policies to determine the value of alarm and warning thresholds. The control policy evaluator provides a mechanism for determining if the LHS of a policy is satisfied at a specific time. The action executor provides a means for executing the right-hand side of policies.

Specifically, an agent side policy controller according to the invention, may preferably perform the following operations: (i) invoke the model constructor for un-instantiated models; (ii) invoke the threshold constructor to determine metric thresholds in control policies based on policies for false alarms and warnings; (iii) invoke the control policy evaluator to determine which policies satisfy their left-hand sides; (iv) determine which control policies are enabled based on their trigger policies; (v) determine if model reconstruction is required based on model reconstruction policies; and (vi) invoke the action executor for enabled control policies.

The present invention provides many ways to reduce the burden of performance management. First, the invention eliminates the need for administrators to specify alarm thresholds. Instead, thresholds are computed dynamically based on historical data, metric models, and separately specified policies for false alarms and warnings.

Second, the present invention separates trigger policies from control policies. In existing practice, trigger policies are embedded within the left-hand side of policy rules. Thus, changing a trigger policy may require administrators to modify many policy rules. By separating trigger and control policies, we simplify the control policies and provide an easy way for administrators to adjust the manner in which transient problems are addressed.

Third, our invention provides a systematic way to provide warnings. In existing practice, warnings are provided in an ad hoc and cumbersome way in that additional policies must be constructed and the relationship between warnings and alarms is unclear. In contrast, the present invention provides a method for constructing warning policies automatically, without specifying metric thresholds. This is done by having warning policies that express the minimum probability of a threshold violation for which administrators want to be notified of a possible alarm at a future time. Through our invention, the burden imposed on administrators is greatly reduced, and the semantics of warnings are more clear.

Fourth, our invention employs model reconstruction policies that determine when metric models should be reconstructed automatically (e.g., due to changes in workload, configuration, or other factors). Such policies provide a means for automated adaptation of the model-based approach to performance management.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be described below in the context of an exemplary system architecture. However, it is to be understood that the invention is not limited to a particular system architecture but is rather more generally applicable to use in systems in which it is desirable to reduce the burden on an system administrator with respect to system performance management functions.

Figure 1:
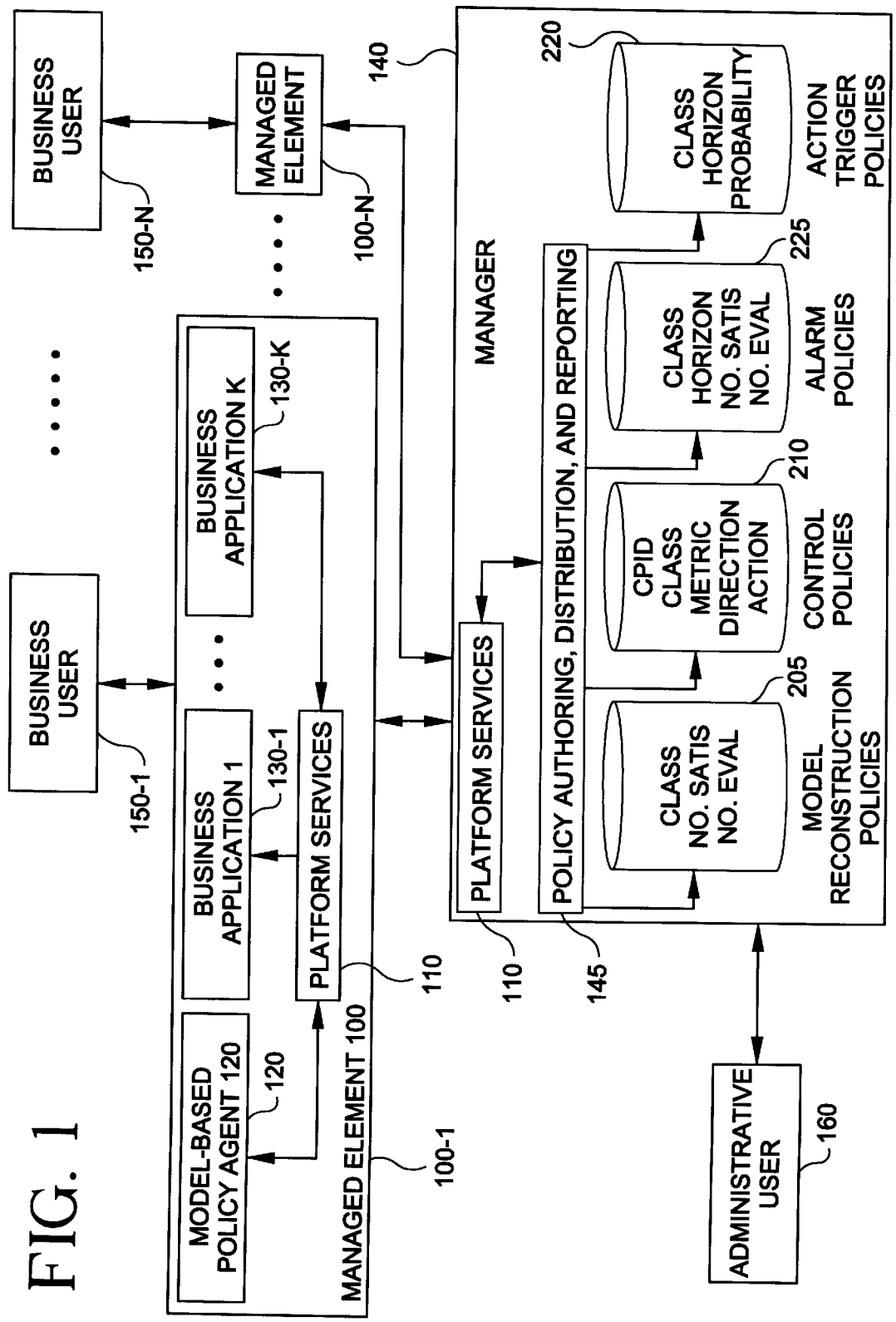
FIG. 1 is a block diagram illustrating a performance management system according to an exemplary embodiment of the present invention.

Referring now to FIG. 1, a block diagram illustrating a performance management system according to an exemplary embodiment of the present invention is shown. In the system as shown, one or more business users 150 (150-1 through 150-N) respectively interact with one or more managed elements 100 (100-1 through 100-N). The number of business users may also differ from the number of managed elements. Each managed element may have one or more business applications 130 (130-1 through 130-K) that utilize platform services 110.

It is to be understood that the invention is not limited to any particular application, or business application for that matter. However, some examples of business applications 130 with which the invention may be employed are enterprise resource planning, inventory management, billing, payroll. Also, the invention is not limited to any particular platform services. However, examples of platform services 110 are memory management, file system access, network access, and name resolution.

On each managed element is also a model-based policy agent 120 that enforces performance management policies, as will be explained in detail below. The managed elements communicate with a manager 140 that is controlled by an administrative user 160 who is responsible for authoring and ensuring the distribution of management policies through the policy authoring, distribution, and reporting component 145. In particular, the manager 140 provides an administrator 160 a place to enter information into the following repositories: model reconstruction policies 205, alarm policies 225, control policies 210, and action trigger policies 220. Policy authoring, distribution, and reporting is well understood in the art. It involves, for example: entering information in a graphical user interface to be stored in a database, distributing databases to other machines, and reporting the results of events that take place on remote machines. Platform services 110 similar to the services provided for in the managed elements 100 may be provided in the manager 140. However, other services specific to the manager may be provided. One or more of these platform services allow the manager to communicate with the managed elements.

To elaborate on the contents of the policy repositories, the model reconstruction policies specify a class description and the number of times the policy must be satisfied for a specified number of evaluations of the policy. Alarm policies provide the means to construct alarm and warning thresholds. As such, each contains a class description, time horizon, and probability. The latter is interpreted as a probability of a false alarm in the case of alarm thresholds, and the probability of exceeding the alarm threshold in the case of warning thresholds. Control policies specify: a control policy identifier or CPID (a unique identifier for each control policy), policy class, metric, directional change of the metric that is considered undesirable, and action to take. Note that there may be multiple entries for a single CPID to provide for AND/OR logic that combines multiple individual thresholds. Action trigger policies include the class description and the number of times that the LHS of a control policy must be satisfied for a number of evaluations of the LHS.

Figure 2:
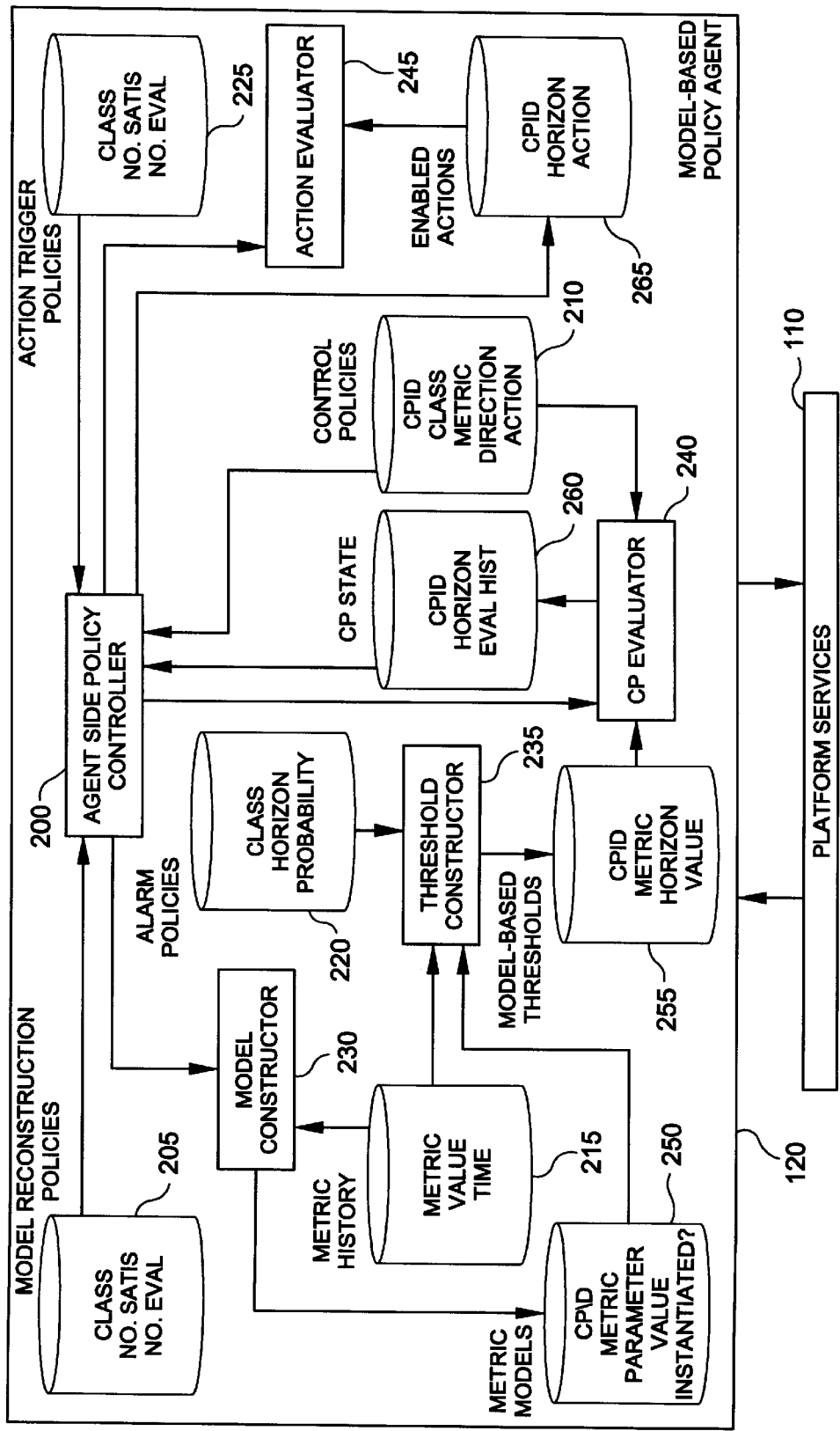
FIG. 2 is a block diagram illustrating a model-based policy agent according to an exemplary embodiment of the present invention.

Referring now to FIG. 2, a block diagram illustrating a model-based policy agent 120 according to an exemplary embodiment of the present invention is shown. In the model-based policy agent, an agent side policy controller 200 provides overall control and interacts with the platform services to update local copies of policy repositories and to report alarms and warnings to the manager 140. The agent side policy controller 200 invokes a model constructor 230 to estimate the values of unknown constants in models based on historical values of measurement data 215. The model constructor 230 produces values of metric models 250 for each control policy (or CPID). The operation of component 230 is well understood, as disclosed in the literature on time series forecasting, e.g., G.E.P. Box and G. M. Jenkins, "Time Series Analysis," Prentice Hall, 1977. The agent 120 also includes a threshold constructor 235 which uses the metric models 250, metric history 215, and alarm policies 220 to compute values of alarm and warning thresholds in the model-based threshold repository 255. For example, such components and models which may be used to forecast future values of particular metrics are described above with regard to the above-referenced Hellerstein et al. article ("An Approach to Predictive Detection for Service Level Management," Integrated Network Management VI, edited by M. Sloman et al., IEEE Publishing, May 1999), e.g., the forecasting or predictive models, S(i,j,k,l) and e(t). However, it is to be appreciated that other forecasting or predictive models may be used.

Control policies are evaluated using a CP (control policy) evaluator 240, which outputs control policy state information 260 by CPID, time horizon, and evaluation history. The CP evaluator evaluates threshold-based policies, except that threshold values are in the CP state repository 260 instead of being embedded within the policy itself. Indexing from the policy to the threshold in the repository is done in a straightforward way by using the CPID.

The CP state repository is used by the agent side policy controller to interpret action trigger policies and model reconstruction policies. The actions of enabled policies are written to the repository 265. An action executor 245 reads repository 265 and executes each action in turn.

Figure 3:
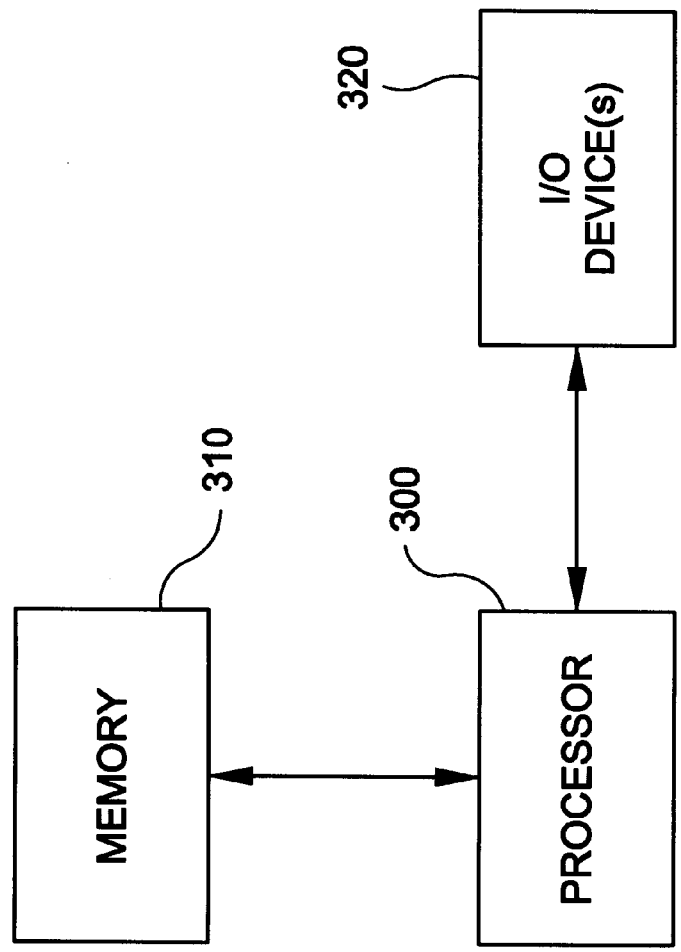
FIG. 3 is a block diagram illustrating a hardware implementation of components of a performance management system according to an exemplary embodiment of the present invention.

Referring now to FIG. 3, a block diagram is shown of an illustrative hardware implementation for both a managed element (e.g., 100-1 through 100-N) and a manager 140 according to the invention. In one embodiment, a managed element 100 and a manager 140 may be respectively implemented in individual computer systems. Each computer system may include a processor 300 coupled to a memory 310 and I/O device(s) 320, as shown in FIG. 3.

It is to be appreciated that the term "processor" as used herein is intended to include any processing device, such as, for example, one that includes a CPU (central processing unit). The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, mouse, etc., for inputting data to the processing unit, and/or one or more output devices, e.g., CRT display, printer, etc., for providing results associated with the processing unit. It is also to be understood that various elements associated with a processor may be shared by other processors. Accordingly, software components including instructions or code for performing the methodologies of the invention, as described herein, may be stored in one or more of the associated memory devices (e.g., ROM, fixed or removable memory, etc.) and, when ready to be utilized, loaded in part or in whole (e.g., into RAM) and executed by a CPU.

For example, in the case of a managed element, the processor 300 performs the functions associated with the various components running therein, e.g., the model-based policy agent 120. The memory 310 may be used by the processor for performing such functions and for storing data associated with the various repositories and results of the processes. The I/O devices may include one or more data input devices for inputting data, e.g., to be used in by the policy agent. The I/O devices may also include one or more data output devices for presenting a user with results associated with the functions performed in accordance with the various components, e.g., presenting a business user with an alarm or warning. By way of example, a display may present a user with a graphical user interface for viewing such results.

As indicated, both the managed elements and the manager may have such a hardware architecture as shown in FIG. 3. As such, the processor 300, memory 310 and I/O devices 320 in a computer system embodying a manager 140 permit an administrator to perform the functions and methodologies of the manager as are known and/or described herein.

Also, it is to be appreciated that the computer systems of the managed elements and the manager may be in communication with each other via conventional communication links, e.g., local area network, wide area network, etc. Further, as mentioned, more than one computer system may be employed to implement the components illustrated in a managed element or a manager.

Figure 4:
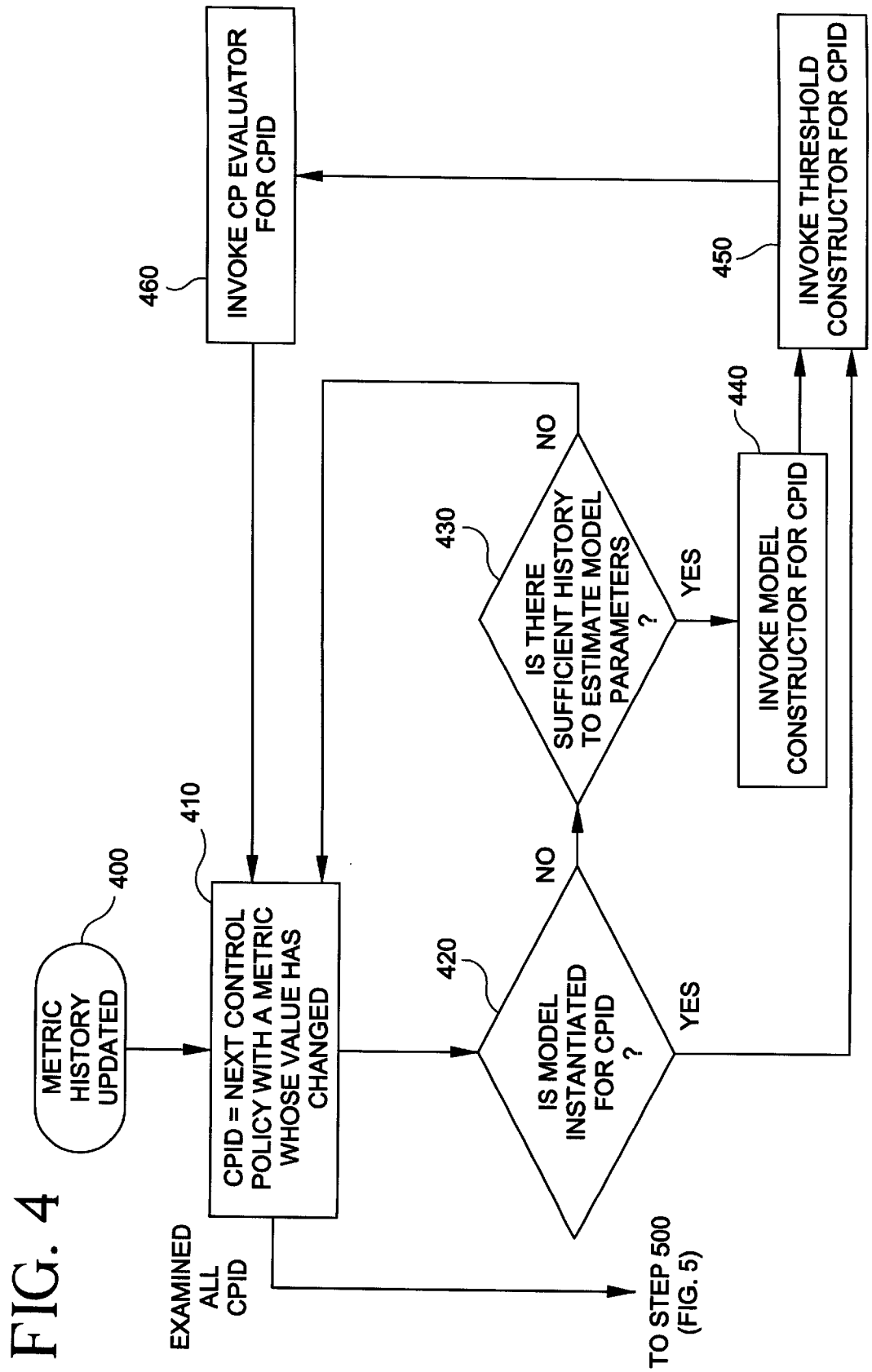
FIG. 4 is a flow diagram illustrating a first portion of a method for interpreting model-based policies according to an exemplary embodiment of the present invention.

Referring now to FIG. 4, a flow diagram is shown illustrating a first portion of a method for interpreting model-based policies according to an exemplary embodiment of the present invention. It is to be appreciated that a model-based policy agent such as illustrated in FIG. 2 may be employed to perform this methodology. As such, reference will be made to various components of the policy agent 120 in FIG. 2.

In step 400, metric data is updated. In step 410, an iteration loop is begun in which each control policy is examined. The control policy currently under consideration is denoted by CPID. Step 420 is reached if there is an unexamined control policy. This step consults repository 250 to determine if all of its entries for the current CPID have a variable referred to as "Instantiated?" equal to true. If this is not the case, step 430 is invoked to determine if there is sufficient data to estimate the unknown constants in the model(s) of the metric(s). in CPID. If this is not the case, control returns to step 410. If it is the case, then the model constructor 230 is invoked in step 440, and the metric models in repository 250 are updated. In step 450, thresholds are constructed for the metrics of CPID and written to repository 255. In step 460, the CP evaluator 240 is invoked for CPID and the repository 260 is updated. When all CPIDs have been processed, control passes to step 500 of FIG. 5 to be explained below.

Figure 5:
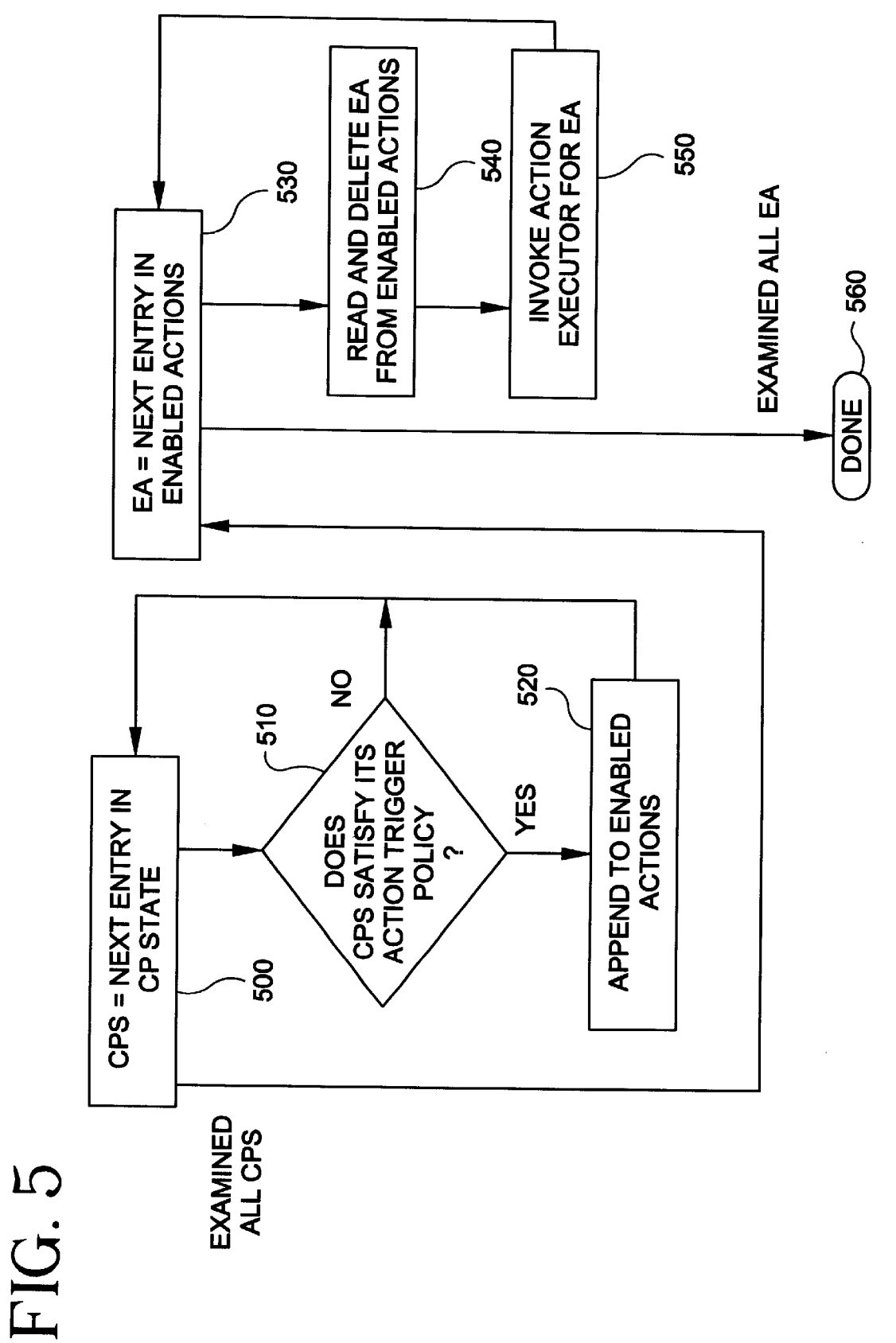
FIG. 5 is a flow diagram illustrating a second portion of a method for interpreting model-based policies according to an exemplary embodiment of the present invention.

FIG. 5 is a flow diagram illustrating a second portion of a method for interpreting model-based policies according to an exemplary embodiment of the present invention. Again, a model-based policy agent such as illustrated in FIG. 2 may be employed to perform this methodology and, as such, reference will be made to various components of the policy agent 120 in FIG. 2.

Step 500 selects the next control policy state from the CP state repository 260. In step 510, an "EvalHist" field of this entry is consulted to determine if it satisfies the appropriate action trigger policy in repository 225. If this is the case, then the action of the control policy is appended to the Enabled Actions (EA) repository 265. When the loop in step 500 terminates, control resumes at step 530, where a loop begins for each enabled action in the repository 265. The current entry is denoted by EA. In step 540, the EA is read and deleted from the enabled actions repository. In step 550, the action executor 245 is invoked for the action in entry EA. Once all entries in repository 265 have been processed, the method terminates.

To illustrate our invention, consider the management of routers, hubs, domain name servers and other elements in a network infrastructure. Each device has metrics it exposes, such as CPU utilization, bytes sent, and length of the run queue. Based on these metrics, the operations staff hopes to detect and isolate problems before they lead to performance degradations. Such exception checking requires control policies such as those outlined in our invention. However, workloads are time varying due to variations in user work schedules, business needs, and other factors. Further, the workloads vary from device to device depending on topology and department activities. Thus, providing exception checking in practice means establishing a large number of thresholds for different devices for their operation at different times of the day. This is quite burdensome if performed in the conventional manner.

Our invention provides a means to reduce the demands on the operations staff for performance management. Instead of specifying detailed policies for individual metrics, the staff provides higher level policies, such as "alarm if CPU utilization is too large." Doing so only requires specifying one threshold instead of many. Further, the same policy can be used for multiple, disparate devices.

To provide this capability, our invention has a means for authoring policies, both control policies and meta policies. The enactment system of our invention provides a means for constructing models of metrics that determine the normal variation of metric values. The threshold constructor then combines the calculations in the model with the control policy specifications stated by the analyst. These compiled policies are evaluated dynamically by the CP evaluator, which determines if an exceptional situation exists.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. Apparatus for use in monitoring at least one of performance and availability of at least one managed element, the apparatus comprising:

at least one processor operative to: (i) construct at least one model for at least one metric, the metric being generated by the managed element being monitored; (ii) determine at least one threshold value associated with the metric for inclusion in a control policy which is based on at least one of a false alarm policy and a warning policy; (iii) determine if the control policy applies to a particular situation; and (iv) execute an action associated with the control policy if the control policy applies; and a memory coupled to the processor which stores at least one of the constructed model, the threshold value and the policy.

2. The apparatus of claim 1, wherein the processor determines the threshold value automatically based on an external specification of the false alarm policy.

3. The apparatus of claim 1, wherein the processor determines the threshold value automatically based on an external specification of the warning policy.

4. The apparatus of claim 1, wherein the processor reconstructs the model based on the frequency of satisfying a predicate associated with the control policy.

5. The apparatus of claim 1, wherein the processor expresses and interprets the control policy using a dynamically constructed threshold value.

6. The apparatus of claim I, wherein the processor interprets the control policy according to at least one meta policy.

7. A computerized method for use in monitoring at least one of performance and availability of at least one managed element, the method comprising the steps of:

constructing at least one model for at least one metric, the metric being generated by the managed element being monitored;

automatically determining at least one threshold value associated with the metric for inclusion in a control policy which is based on at least one of a false alarm policy and a warning policy;

determining if the control policy applies to a particular situation; and executing an action associated with the control policy if the control policy applies.

8. The method of claim 7, wherein the automatic threshold value determining operation is based on an external specification of the false alarm policy.

9. The method of claim 7, wherein the automatic threshold value determining operation is based on an external specification of the warning policy.

10. The method of claim 7, further comprising the step of reconstructing the model based on the frequency of satisfying a predicate associated with the control policy.

11. The method of claim 7, further comprising the step of expressing and interpreting the control policy using a dynamically constructed threshold value.

12. The method of claim 7, further comprising the step of interpreting the control policy according to at least one meta policy.

13. An article of manufacture for use in monitoring at least one of performance and availability of at least one managed element, comprising a machine readable medium containing one or more programs which when executed implement the steps of:

constructing at least one model for at least one metric, the metric being generated by the managed element being monitored;

automatically determining at least one threshold value associated with the metric for inclusion in a control policy which is based on at least one of a false alarm policy and a warning policy;

determining if the control policy applies to a particular situation; and executing an action associated with the control policy if the control policy applies.

14. A system for managing at least one of a performance metric and an availability metric, comprising:

at least one managed element; and at least one policy agent operatively coupled with the managed element, the policy agent including:

a model constructor for constructing at least one model for at least one metric, the metric being generated by the managed element being monitored;

a threshold constructor for automatically determining at least one threshold value associated with the metric for inclusion in a control policy which is based on at least one of a false alarm policy and a warning policy;

a control policy evaluator for determining if the control policy applies to a particular situation; and an action executor for executing an action associated with the control policy if the control policy applies.

15. The system of claim 14, further comprising a system manager operatively coupled to the managed element for at least one of authoring, distributing and reporting a policy.

* * * * *